(12) United States Patent
Kraynev et al.

(10) Patent No.: US 8,360,919 B2
(45) Date of Patent: Jan. 29, 2013

(54) MULTI-SPEED TRANSMISSION

(75) Inventors: Alexander Filippovich Kraynev, Moscow (RU); Vladimir Konstantinovich Astashev, Moscow (RU); Konstantin Borisovich Salamandra, Moscow (RU); Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 156 days.

(21) Appl. No.: 12/954,942

(22) Filed: Nov. 29, 2010

(65) Prior Publication Data

US 2011/0245014 A1 Oct. 6, 2011

(30) Foreign Application Priority Data

Mar. 31, 2010 (RU) ................ 2010112596

(51) Int. Cl.
*F16H 37/02* (2006.01)

(52) U.S. Cl. ............ 475/207; 74/665 R; 74/329; 74/331

(58) Field of Classification Search .................. 475/198, 475/207, 214, 215, 218, 329, 343; 74/665 R, 74/665 F, 665 G, 664, 329, 331
See application file for complete search history.

(56) References Cited

U.S. PATENT DOCUMENTS

| 4,070,927 A | 1/1978 | Polak |
| 4,709,594 A | 12/1987 | Maeda |
| 5,106,352 A | 4/1992 | Lepelletier |
| 5,385,064 A | 1/1995 | Reece |

(Continued)

FOREIGN PATENT DOCUMENTS

| DE | 102007047671 A1 | 4/2009 |
| JP | 09-126283 A | 5/1997 |

(Continued)

OTHER PUBLICATIONS

Masami Kondo, Yoshio Hasegawa, Yoji Takanami, Kenji Arai, Masaharu Tanaka, Masafumi Kinoshita, Takeshi Ootsuki, Tetsuya Yamaguchi, Akira Fukatsu, "Toyota AA80E 8-Speed Automatic Transmission with Novel Powertrain Control System", SAE Technical Paper Series, Apr. 16-19, 2007, 2007-01-1311, Warrendale, PA 15096-0001 USA.

(Continued)

*Primary Examiner* — Justin Holmes
(74) *Attorney, Agent, or Firm* — Quinn Law Group, PLLC

(57) ABSTRACT

A transmission includes an input member, an output member, an intermediate member, and a simple planetary gear set, all of which are coaxial. A first and a second layshaft are arranged to define a second axis of rotation and a third axis of rotation, respectively. Five sets of intermeshing gears are provided, some of which are arranged to transfer torque from the input member to the layshafts, and others of which are arranged to transfer torque from the layshafts to one of the intermediate member and the simple planetary gear set. Seven torque-transmitting mechanisms are each selectively engagable to connect a different respective gear of the sets of intermeshing gears to a respective one of the layshafts or to a stationary member. The torque-transmitting mechanisms are engagable in different combinations to establish multiple forward speed ratios and a reverse speed ratio between the input member and the output member.

19 Claims, 2 Drawing Sheets

U.S. PATENT DOCUMENTS

| | | | |
|---|---|---|---|
| 5,497,867 A | 3/1996 | Hirsch et al. | |
| 5,560,461 A | 10/1996 | Loeffler | |
| 5,599,251 A | 2/1997 | Beim et al. | |
| 5,641,045 A | 6/1997 | Ogawa et al. | |
| 5,651,435 A | 7/1997 | Perosky et al. | |
| 5,975,263 A | 11/1999 | Forsyth | |
| 6,053,839 A | 4/2000 | Baldwin et al. | |
| 6,071,208 A | 6/2000 | Koivunen | |
| 6,083,135 A | 7/2000 | Baldwin et al. | |
| 6,217,474 B1 | 4/2001 | Ross et al. | |
| 6,354,416 B1 | 3/2002 | Eo | |
| 6,375,592 B1 | 4/2002 | Takahashi et al. | |
| 6,422,969 B1 | 7/2002 | Raghavan et al. | |
| 6,425,841 B1 | 7/2002 | Haka | |
| 6,471,615 B1 | 10/2002 | Naraki et al. | |
| 6,558,287 B2 | 5/2003 | Hayabuchi et al. | |
| 6,623,397 B1 | 9/2003 | Raghavan et al. | |
| 6,840,885 B2 | 1/2005 | Yi et al. | |
| 6,962,548 B2 | 11/2005 | Bucknor et al. | |
| 2006/0014603 A1 | 1/2006 | Raghavan et al. | |
| 2008/0182719 A1* | 7/2008 | Long et al. | 477/127 |
| 2009/0071274 A1* | 3/2009 | Bader et al. | 74/335 |
| 2009/0071277 A1* | 3/2009 | Bader et al. | 74/336 R |
| 2010/0029431 A1* | 2/2010 | Rodgers, II | 475/218 |
| 2010/0218643 A1 | 9/2010 | Gitt et al. | |

FOREIGN PATENT DOCUMENTS

| | | |
|---|---|---|
| RU | 2251636 C1 | 5/2005 |
| SU | 1062034 A1 | 12/1983 |
| WO | 03025431 A1 | 3/2003 |
| WO | 2006032312 A1 | 3/2006 |
| WO | 2006074707 A1 | 7/2006 |

OTHER PUBLICATIONS

Hirofumi Ota, Kazutoshi, Nozaki, Atsushi Honda, Masafumi Kinoshita, Toshihiko Aoki, Minoru Todo, Mikio Iwase, "Toyota's World First 8-Speed Automatic Transmission for Passenger Cars", SAE Technical Paper Series, Apr. 16-19, 2007, 2007-01-1101, Warrendale, PA 15096-0001 USA.

* cited by examiner

| GEAR STATE | GEAR RATIO | STEP RATIO | C1 | C2 | C3 | C4 | C5 | C6 | C7 |
|---|---|---|---|---|---|---|---|---|---|
| 1ST | 6.94 |  | X |  |  | X |  |  |  |
| 2ND | 3.47 | 2.00 | X |  | X |  |  |  |  |
| (3RD) | 3.02 | 1.15 |  |  |  |  |  | X | X |
| 4TH | 2.10 | 1.44 |  | X |  |  |  | X |  |
| 5TH | 1.61 | 1.30 |  |  |  | X |  | X |  |
| 6TH | 1.31 | 1.23 |  |  | X |  |  | X |  |
| (7TH) | 1.24 | 1.06 |  |  |  |  | X |  | X |
| 8TH | 1.05 | 1.18 |  | X |  |  | X |  |  |
| 9TH | 0.91 | 1.15 |  |  |  | X | X |  |  |
| 10TH | 0.81 | 1.12 |  |  | X |  | X |  |  |
| REV | -6.94 |  | X |  |  |  |  |  | X |

X = ENGAGED STATE

| GEAR STATE | GEAR RATIO | STEP RATIO | C1 | C2 | C3 | C4 | C5 | C6 | C7 |
|---|---|---|---|---|---|---|---|---|---|
| 1ST | 4.789 | | X | | | X | | | |
| 2ND | 3.592 | 1.333 | | X | | | X | | |
| 3RD | 2.695 | 1.333 | | | X | | X | | |
| 4TH | 2.053 | 1.313 | X | | | X | | | |
| 5TH | 1.540 | 1.333 | | | | X | X | | |
| 6TH | 1.138 | 1.353 | | X | | | | X | |
| 7TH | 0.919 | 1.238 | | | X | | | X | |
| 8TH | 0.800 | 1.149 | | | | X | | X | |
| REV | | | X | | | | | | X |

X = ENGAGED STATE

FIG. 3

MULTI-SPEED TRANSMISSION

CROSS-REFERENCE TO RELATED APPLICATION

This application claims the benefit of Russian Patent Application No. 2010112596, filed Mar. 31, 2010, which is hereby incorporated by reference in its entirety.

TECHNICAL FIELD

The invention relates to a multi-speed planetary transmission with layshafts having gears establishing five sets of intermeshing transfer gears, and with a simple planetary gear set.

BACKGROUND OF THE INVENTION

Automotive vehicles include a powertrain that is comprised of an engine, a multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising other than the most efficient point. Therefore, manually-shifted (layshaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improved the shift quality of the transmission by making the ratio interchanges substantially imperceptible to the operator under normal vehicle acceleration.

Multi-speed transmissions with greater than four speed ratios provide further improvements in acceleration and fuel economy over three- and four-speed transmissions. However, typical increased complexity, size and cost of such transmissions are competing factors which may prevent their use in some applications.

SUMMARY OF THE INVENTION

A multi-speed transmission is provided that utilizes a simple planetary gear set and torque transfer using sets of intermeshing gears and layshafts. The transmission includes an input member, an output member, and an intermediate member, all of which are coaxial. A stationary member, such as a transmission casing, is provided. The transmission further includes a simple planetary gear set. The input member, the output member, the intermediate member, and the simple planetary gear set are arranged coaxially with one another to define a first axis of rotation. A first and a second layshaft define a second axis of rotation and a third axis of rotation, respectively. Seven selectively engagable torque-transmitting mechanisms, such as clutches, are engaged to transfer torque to establish the various speed ratios. As used herein, a "clutch" means a rotating-type clutch or a stationary-type clutch, otherwise referred to as a brake. Different ones of the clutches may be friction clutches, synchronizers, band clutches, a selectively engagable one-way clutch, a dog clutch, or other types of clutches.

Five sets of intermeshing gears are provided, some of which are arranged to transfer torque from the input member to the layshafts, and others of which are arranged to transfer torque from the layshafts to the intermediate member or to the simple planetary gear set. The sets of intermeshing gears are also referred to as transfer gears. Each set of intermeshing gears is axially spaced from the other sets of intermeshing gears. The seven torque-transmitting mechanisms are each selectively engagable to connect a different respective gear of the intermeshing sets of gears to a respective one of the layshafts or to the stationary member. The seven torque-transmitting mechanisms are engagable in different combinations to establish multiple forward speed ratios and a reverse speed ratio between the input member and the output member. As used herein, "common rotation" means rotation at the same speed (i.e., no relative rotation). As used herein, "gear ratio" is the ratio of the torque of the output member to the torque of the input member, while "speed ratio" is the ratio of the speed of the input member to the speed of the output member.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a truth table depicting alternative operating characteristics of the transmission shown in FIG. 1.

DESCRIPTION OF THE PREFERRED EMBODIMENTS

Figures 1, 2:
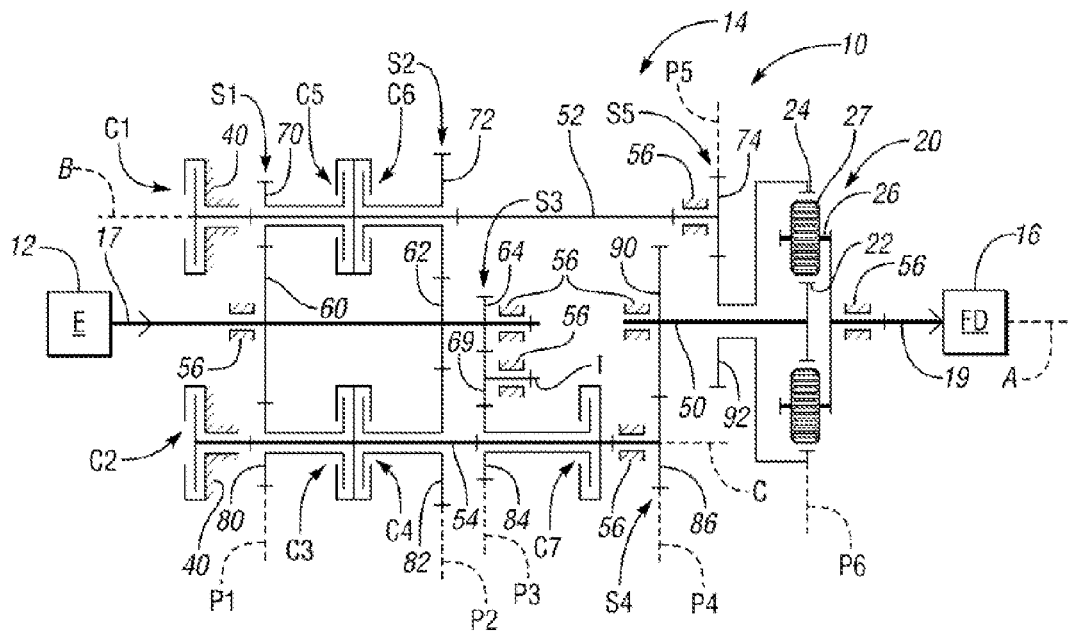
FIG. 1 is a schematic illustration in stick diagram form of a powertrain having a multi-speed transmission.
FIG. 2 is a truth table depicting some of operating characteristics of the transmission shown in FIG. 1.

Referring to the drawings, wherein like reference numbers refer to like components, FIG. 1 shows the powertrain 10 with an engine 12 (labeled E), a combination layshaft and planetary transmission 14, and a final drive mechanism 16 (labeled FD). The engine 12 may be powered by various types of fuel to improve the efficiency and fuel economy of a particular application. Such fuels may include, for example gasoline, diesel, an ethanol, dimethyl ether, etc. The transmission 14 includes an input member 17 continuously connected with an output member of the engine 12, such as a crankshaft, optionally through a torque converter. The transmission 14 further includes five sets of intermeshing gears, described below, an intermediate member 50, a first layshaft 52, a second layshaft 54, a first planetary gear set 20, and an output member 19 connected with the final drive mechanism 16 for providing propulsion power to vehicle wheels.

The simple planetary gear set 20 includes a sun gear member 22, a ring gear member 24, and a carrier member 26 that rotatably supports a set of pinion gears 27. The pinion gears 27 mesh with sun gear member 22 and ring gear member 24. The sun gear member 22 is referred to as the first member of the simple planetary gear set 20 and is connected for common rotation with the intermediate member 50. The carrier member 26 is referred to as the second member of the simple planetary gear set 20 and is connected for common rotation with the output member 19. The ring gear member 24 is referred to as the third member of the planetary gear set 20 and is connected for common rotation with gear 92.

The transmission 14 includes multiple shafts arranged to define three different axes of rotation A, B, and C. The input member 17, the output member 19, the intermediate member 50 and the planetary gear set 20 are coaxial and define a first axis of rotation A. A first layshaft 52 and a second layshaft 54 are spaced parallel to the first axis of rotation A, and define a second axis of rotation B, and a third axis of rotation C, respectively.

A first set S1 of intermeshing gears includes gears 70, 60, and 80, which mesh in a first gear plane P1. Gear 60 is connected for rotation with input member 17. Gear 70 meshes with gear 60, and rotates concentrically about layshaft 52. Gear 80 meshes with gear 60 and rotates concentrically about layshaft 54. The input member 17, layshafts 52 and 54, intermediate member 50, and output member 19 are supported for rotation by grounded bearings 56.

A second set S2 of intermeshing gears includes gears 72, 62, and 82, which mesh in a second gear plane P2. Gear 62 is connected for rotation with input member 17. Gear 72 meshes with gear 62, and rotates concentrically about layshaft 52. Gear 82 meshes with gear 62 and rotates concentrically about layshaft 54.

A third set S3 of intermeshing gears includes gears 64, 69, and 84, which mesh in a third gear plane P3. Gear 64 is connected for rotation with input member 17. Gear 69 meshes with gear 64, and is connected for rotation with idler shaft I. Gear 84 meshes with gear 69 and rotates concentrically about layshaft 54.

A fourth set S4 of intermeshing gears includes gears 90 and 86, which mesh in a fourth gear plane P4. Gear 90 is connected for rotation with intermediate member 50. Gear 86 meshes with gear 90 and is connected for rotation with layshaft 54.

A fifth set S5 of intermeshing gears includes gears 74 and 92, which mesh in a fifth gear plane P5. Gear 74 is connected for rotation with layshaft 52. Gear 92 meshes with gear 74 and is connected for rotation with ring gear member 24.

The sun gear member 22, ring gear member 24 and pinion gears 27 of the planetary gear set 20 mesh in a sixth gear plane P6. The gear planes P1-P6 extend perpendicular to the drawing sheet in FIG. 1.

The transmission 14 further includes seven torque-transmitting mechanisms: a first torque-transmitting mechanism C1, a second torque-transmitting mechanism C2, a third torque-transmitting mechanism C3, a fourth torque-transmitting mechanism C4, a fifth torque-transmitting mechanism C5, a sixth torque-transmitting mechanism C6, and a seventh torque-transmitting mechanism C7. Torque-transmitting mechanisms C3, C4, C5, C6, and C7 are rotating-type clutches. Torque-transmitting mechanisms C1 and C2 are stationary-type clutches, also referred to as brakes. The torque-transmitting mechanisms C1, C5, and C6 that are concentric with layshaft 52 may be friction-type clutches, while the torque-transmitting mechanisms C2, C3, C4, and C7 concentric with layshaft 54 may be synchronizers actuated by shift forks (not shown) as is understood by those skilled in the art. By placing all of the friction-type clutches adjacent to one another on the same layshaft 52, fluid routing requirements are simplified, as hydraulic fluid flow to the clutches C1, C5 and C6 may be through mostly common feed channels. Simplifying the hydraulic feed channels and reducing the overall length of the feed channels simplifies production of the transmission 14 and may enable a smaller pump for the hydraulic system. Additionally, if only clutches C1, C5 and C6 are friction-type clutches, then, according to the engagement chart of FIG. 2, discussed below, there would only be two open clutches in each speed ratio, limiting spin losses. Alternatively, torque-transmitting mechanisms C2, C3, C4 and C7 may also be friction-type clutches, or torque-transmitting mechanisms C2 and C7 may be single synchronizers and torque-transmitting mechanisms C3 and C4 may be a double-sided synchronizer. Torque-transmitting mechanisms C5 and C6 may also be a double-sided synchronizer. The use of synchronizers in lieu of clutches reduces spin losses. In other embodiments, the torque-transmitting mechanisms may be still different types of clutches.

The first torque-transmitting mechanism C1, also referred to as brake C1, is a stationary-type clutch selectively engagable to ground layshaft 52 to the stationary member 40, thereby holding gear 74 and ring gear member 24 stationary. The second torque-transmitting mechanism C2, also referred to as brake C2, is a stationary-type clutch selectively engagable to ground layshaft 54 to the stationary member 40, thereby holding gear 86, gear 90, intermediate member 50 and sun gear member 22 stationary. The third torque-transmitting mechanism C3, also referred to as clutch C3, is a rotating-type clutch selectively engagable to connect gear 80 for common rotation with layshaft 54. The fourth torque-transmitting mechanism C4, also referred to as clutch C4, is a rotating-type clutch selectively engagable to connect gear 82 for common rotation with the layshaft 54. The fifth torque-transmitting mechanism C5, also referred to as clutch C5, is a rotating-type clutch selectively engagable to connect gear 70 for common rotation with layshaft 52. The sixth torque-transmitting mechanism C6, also referred to as clutch C6, is a rotating-type clutch selectively engagable to connect gear 72 for common rotation with layshaft 52. The seventh torque-transmitting mechanism C7, also referred to as clutch C7, is selectively engagable to connect gear 84 for common rotation with layshaft 54.

As shown in the truth table of FIG. 2, the torque-transmitting mechanisms C1, C2, C3, C4, C5, C6, and C7 are selectively engagable in combinations of two to provide up to ten forward speed ratios and a reverse speed ratio (listed as gear states). Numerical gear ratios corresponding with the speed ratios are listed in FIG. 2. The gear ratio is the ratio of the torque of the output member 19 to the torque of the input member 17.

The third (3rd) and the seventh (7th) forward speed ratios are listed in brackets, as they are optional. The transmission 14 would be an eight-speed transmission if neither of these speed ratios is available, or a nine-speed transmission if only one of these two speed ratios is available.

The numerical gear ratios set forth in FIG. 2 result from the tooth counts establishing the following gear ratios. The gear ratio of gear 70 and of gear 80 to gear 60 is −0.5. The gear ratio of gear 72 and of gear 82 to gear 62 is −1.0. The gear ratio of gear 84 to gear 64 is +1.0. The gear ratio of gear 90 to gear 86 is −2.0. The gear ratio of gear 92 to gear 74 is −1.5. The gear ratio of ring gear member 24 to sun gear member 22 is −2.5, assuming the carrier member 26 is stopped (for purposes of calculation only).

With the tooth counts resulting in the gear ratios listed above, there are eight underdrive speed ratios (1st to 8th), and two overdrive speed ratios (9th and 10th) that result in the ratio steps listed in FIG. 2. As is apparent in FIG. 2, the ratio steps are relatively even in the third (3rd) through the tenth (10th) forward speed ratios, resulting in smooth shift feel and increased fuel efficiency as the engine 12 need only operate over a narrow range of speeds in each speed ratio.

To establish the reverse speed ratio (REV), brake C1 and clutch C7 are engaged. Because brake C1 is engaged, the ring gear member 24 is held stationary. Because clutch C7 is engaged, torque is transferred through intermeshing gears 64, 69, and 84 along layshaft 54, through intermeshing gears 86 and 90 to sun gear member 22, and through planetary gear set 20 to output member 19. The output member 19 rotates in an opposite direction from the input member 17.

To establish the first speed ratio (1st), brake C1 and clutch C4 are engaged. Because brake C1 is engaged, the ring gear member 24 is held stationary. Because clutch C4 is engaged, torque is carried from the input member 17 through intermeshing gears 62, 82 to layshaft 54, through intermeshing gears 86, 90 to sun gear member 22, and through planetary gear set 20 to output member 19. Input member 17 and output member 19 rotate in the same direction, as in all of the forward speed ratios.

To establish the second speed ratio (2nd), brake C1 and clutch C3 are engaged. Because brake C1 is engaged, the ring gear member 24 is held stationary. Because clutch C3 is engaged, torque is carried from the input member 17 through intermeshing gears 60, 80 to layshaft 54, through intermeshing gears 86, 90 to sun gear member 22, and through planetary gear set 20 to output member 19. The shift from the first speed ratio to the second speed ratio is a single-transition shift.

To establish the third speed ratio (3rd), clutches C6 and C7 are engaged. Because clutch C6 is engaged, torque is carried from the input member 17 through intermeshing gears 62, 72 to layshaft 52, through intermeshing gears 74, 92 to ring gear member 24. Because clutch C7 is engaged, torque is carried from input member 17 through intermeshing gears 64, 69, 84 to layshaft 54, and intermeshing gears 86, 90 to sun gear member 22. Torque provided at sun gear member 22 is added to that provided at ring gear member 24 through the planetary gear set 20 to carrier member 26 and the output member 19. The shift from the second speed ratio to the third speed ratio is a double-transition shift.

To establish the fourth speed ratio (4th), brake C2 and C6 are engaged. Because brake C2 is engaged, the sun gear member 22 is held stationary. Because clutch C6 is engaged, torque is carried from the input member 17 through intermeshing gears 62, 72 to layshaft 52, through intermeshing gears 74, 92 to ring gear member 24, through planetary gear set 20 to output member 19. The shift from the third speed ratio to the fourth speed ratio is a single-transition shift.

To establish the fifth speed ratio (5th), clutches C4 and C6 are engaged. Because clutch C4 is engaged, torque is carried from the input member 17 through intermeshing gears 62, 82 to layshaft 54, through intermeshing gears 86, 90 to sun gear member 22. Because clutch C6 is engaged, torque is carried from the input member 17 through intermeshing gears 62, 72 to layshaft 52, through intermeshing gears 74, 92 to ring gear member 24. Torque provided to sun gear member 22 is subtracted from torque provided to ring gear member 24, and torque flows through planetary gear set 20 to carrier member 26 and output member 19. The shift from the fourth speed ratio to the fifth speed ratio is a single-transition shift.

To establish the sixth speed ratio (6th), clutches C3 and C6 are engaged. Because clutch C3 is engaged, torque is carried from the input member 17 through intermeshing gears 60, 80 to layshaft 54, through intermeshing gears 86, 90 to sun gear member 22. Because clutch C6 is engaged, torque is carried from the input member 17 through intermeshing gears 62, 72 to layshaft 52, through intermeshing gears 74, 92 to ring gear member 24. Torque provided to sun gear member 22 is subtracted from torque provided to ring gear member 24, and torque flows through planetary gear set 20 to carrier member 26 and output member 19. The shift from the fifth speed ratio to the sixth speed ratio is a single-transition shift.

To establish the seventh speed ratio (7th), clutches C5 and C7 are engaged. Because clutch C5 is engaged, torque is carried from the input member 17 through intermeshing gears 60, 70 to layshaft 52, through intermeshing gears 74, 92 to ring gear member 24. Because clutch C7 is engaged, torque is carried from the input member 17 through intermeshing gears 64, 69, 84 to layshaft 54, through intermeshing gears 86, 90 to sun gear member 22. Torque provided to sun gear member 22 is added to torque provided to ring gear member 24, and torque flows through planetary gear set 20 to carrier member 26 and output member 19. The shift from the sixth speed ratio to the seventh speed ratio is a double-transition shift.

To establish the eight speed ratio (8th), brake C2 and clutch C5 are engaged. Because brake C2 is engaged, the sun gear member 22 is held stationary. Because clutch C5 is engaged, torque is carried from the input member 17 through intermeshing gears 60, 70 to layshaft 52, through intermeshing gears 74, 92 to ring gear member 24, through planetary gear set 20 to output member 19. The shift from the seventh speed ratio to the eighth speed ratio is a single-transition shift.

To establish the ninth speed ratio (9th), clutches C4 and C5 are engaged. Because clutch C5 is engaged, torque is carried from the input member 17 through intermeshing gears 60, 70 to layshaft 52, through intermeshing gears 74, 92 to ring gear member 24. Because clutch C4 is engaged, torque is carried from the input member 17 through intermeshing gears 62, 82 to layshaft 54, through intermeshing gears 86, 90 to sun gear member 22. Torque provided to sun gear member 22 is subtracted from torque provided to ring gear member 24, and torque flows through planetary gear set 20 to carrier member 26 and output member 19. The shift from the eighth speed ratio to the ninth speed ratio is a single-transition shift.

To establish the tenth speed ratio (10th), clutches C3 and C5 are engaged. Because clutch C5 is engaged, torque is carried from the input member 17 through intermeshing gears 60, 70 to layshaft 52, through intermeshing gears 74, 92 to ring gear member 24. Because clutch C3 is engaged, torque is carried from the input member 17 through intermeshing gears 60, 80 to layshaft 54, through intermeshing gears 86, 90 to sun gear member 22. Torque provided to sun gear member 22 is subtracted from torque provided at ring gear member 24, and torque flows through planetary gear set 20 to carrier member 26 and output member 19. The shift from the ninth speed ratio to the tenth speed ratio is a single-transition shift.

Although ten forward speed ratios are available, the transmission 14 may be controlled to operate with only some of the available forward speed ratios. For example, the transmission 14 may be configured to operate as a six-speed transmission, a seven-speed transmission, an eight-speed transmission, or a nine-speed transmission. The transmission 14 could also be operated with less than six forward speed ratios.

In one manner of operating the transmission 14 as an eight-speed transmission, an algorithm stored in a controller that controls valves that direct hydraulic fluid flow to the torque-transmitting mechanisms may establish only the reverse speed ratio, and the third, fourth, fifth, sixth, seventh, eighth, ninth, and tenth forward speed ratios described above as first, second, third, fourth, fifth, sixth, seventh, and eighth forward speed ratios. In such an eighth-speed transmission, there would be only one double-transition shift between the fourth and fifth forward speed ratios (i.e., from the sixth to the seventh forward speed ratios of FIG. 2) and the remaining shifts would be single-transition shifts. Double-transition shifts are more difficult to time than a single-transition shift so that torque disturbances are not apparent and a smooth shift feel is maintained.

To operate the transmission 14 as a nine-speed transmission, all of the forward speed ratios described for the eight-speed transmission would be utilized, as well as either the first or the second forward speed ratio of FIG. 2. The nine-speed transmission would have two double-transition shifts and the remaining shifts would be single-transition shifts.

Other gear tooth counts and corresponding gear ratios may be selected to accomplish speed ratios and ratio steps advantageous to the particular transmission application. For example, as illustrated in the truth table of FIG. 3, the transmission 14 may be operated as an eight-speed transmission with eight successive forward speed ratios corresponding with the clutch engagement schemes of the second (2nd), eighth (8th), tenth (10th), first (1st), ninth (9th), fourth (4th), sixth (6th), and fifth (5th) forward speed ratios of FIG. 2, and with the following gear ratios: the gear ratio of gear 80 to gear 60 is −1.247; the gear ratio of 82 to 62 is −0.702; the gear ratio of gear 70 to gear 60 is −0.551; the gear ratio of gear 72 to gear 62 is −0.174; the gear ratio of gear 90 to gear 86 is −1.775; the gear ratio of gear 92 to gear 74 is −3.508; the gear ratio of gear 24 to gear 22 is −1.164, assuming the carrier member 26 is stopped (for purposes of calculation only). A reverse ratio may be established as set forth in FIG. 2, or a different reverse ratio may be established.

With these gear ratios, the following gear ratios between the input member 17 and the output member 19 are achieved: gear ratio of 4.789 in the first forward speed ratio; gear ratio of 3.592 in the second forward speed ratio; gear ratio of 2.695 in the third forward speed ratio; gear ratio of 2.053 in the fourth forward speed ratio; gear ratio of 1.540 in the fifth forward speed ratio; gear ratio of 1.138 in the sixth forward speed ratio; gear ratio of 0.919 in the seventh forward speed ratio; and gear ratio of 0.800 in the eighth forward speed ratio. The corresponding ratio steps are: ratio step from first forward speed ratio to second forward speed ratio of 1.333; ratio step from second forward speed ratio to third forward speed ratio of 1.333; ratio step from third forward speed ratio to fourth forward speed ratio of 1.313; ratio step from fourth forward speed ratio to fifth forward speed ratio of 1.333; ratio step from fifth forward speed ratio to sixth forward speed ratio of 1.353; ratio step from sixth forward speed ratio to seventh forward speed ratio of 1.238; and ratio step from seventh forward speed ratio to eighth forward speed ratio of 1.149. A person of ordinary skill in the art of transmission design would understand how to select desirable tooth counts.

The powertrain 10 may share components with a hybrid vehicle, and such a combination may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 is only operated to the extent necessary to ensure that the battery is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle can conserve some or all of the fuel that would otherwise be expended to maintain the 25% battery charge level in a conventional hybrid vehicle. It should be appreciated that a hybrid vehicle powertrain is preferably only operated in the charge-depleting mode if the battery can be recharged after the destination is reached by plugging it into an energy source.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
an input member;
an output member;
a stationary member;
an intermediate member;
a simple planetary gear set;
wherein the input member, the output member, the intermediate member, and the simple planetary gear set are arranged coaxially with one another to define a first axis of rotation;
a first and a second layshaft defining a second axis of rotation and a third axis of rotation, respectively;
seven selectively engagable torque-transmitting mechanisms;
five sets of intermeshing gears, some of which are arranged to transfer torque from the input member to the layshafts, and others of which are arranged to transfer torque from the layshafts to one of the intermediate member and the simple planetary gear set; each set of intermeshing gears being axially spaced from the other sets of intermeshing gears;
wherein the seven torque-transmitting mechanisms are each selectively engagable to connect a different respective gear of the sets of intermeshing gears to a respective one of the layshafts or to the stationary member; wherein the seven torque-transmitting mechanisms are engagable in different combinations to establish multiple forward speed ratios and a reverse speed ratio between the input member and the output member;
wherein the simple planetary gear set has a first member continuously connected for common rotation with the intermediate member, a second member continuously connected for common rotation with the output member, and a third member continuously connected for common rotation with one of the gears of one of the sets of intermeshing gears arranged to transfer torque from one of the layshafts to the simple planetary gear set.

2. The multi-speed transmission of claim 1, wherein a first and a second of the seven torque-transmitting mechanisms are selectively engagable to ground the first and the second layshafts to the stationary member, respectively.

3. The multi-speed transmission of claim 1, wherein a first set and a second set of the five sets of intermeshing gears each include a respective gear connected for common rotation with the input member, a respective gear rotatable about the first layshaft and a respective gear rotatable about the second layshaft; wherein two of the seven torque-transmitting mechanisms are respectively selectively engagable to connect a respective one of the gears rotatable about the first layshaft for common rotation with the first layshaft; and wherein two others of the seven torque-transmitting mechanisms are respectively selectively engagable to connect a respective one of the gears rotatable about the second layshaft for common rotation with the second layshaft.

4. The multi-speed transmission of claim 1, wherein a third of the five sets of intermeshing gears includes a first gear connected for common rotation with the input member, a second gear rotatable about the second layshaft, and a third gear meshing with both the first gear and the second gear; and wherein one of the seven torque-transmitting mechanisms is selectively engagable to connect the second gear for common rotation with the second layshaft.

5. The multi-speed transmission of claim 1, wherein a fourth of the five sets of intermeshing gears includes a first gear connected for common rotation with the second layshaft and a second gear meshing with the first gear and connected for common rotation with the intermediate member.

6. The multi-speed transmission of claim 1, wherein a fifth of the five sets of intermeshing gears includes a first gear connected for common rotation with the first layshaft, and a second gear meshing with the first gear and connected for common rotation with a member of the simple planetary gear set.

7. The multi-speed transmission of claim 1, wherein the seven torque-transmitting mechanisms are engagable in different combinations of two to establish at least eight forward speed ratios and a reverse speed ratio between the input member and the output member with only one of the shifts between subsequent forward speed ratios being a double-transition shift and the rest of the shifts between subsequent forward speed ratios being single transition shifts.

8. The multi-speed transmission of claim 1, wherein the seven torque-transmitting mechanisms are engagable in different combinations of two to establish ten forward speed ratios and a reverse speed ratio between the input member and the output member with only two of the shifts between subsequent forward speed ratios being double-transition shifts and the rest of the shifts between subsequent forward speed ratios being single transition shifts.

9. The multi-speed transmission of claim 1, wherein the seven torque-transmitting mechanisms includes two brakes and five rotating-type clutches.

10. The multi-speed transmission of claim 1, wherein the seven torque-transmitting mechanisms are selectively engagable to establish eight forward speed ratios with step ratios between at least some subsequent ones of the forward speed ratios being identical.

11. The multi-speed transmission of claim 1, wherein at least some of the seven torque-transmitting mechanisms are synchronizers.

12. The multi-speed transmission of claim 11, wherein four of the seven torque-transmitting mechanisms are coaxial about the third axis of rotation and are synchronizers; and wherein another three of the seven torque-transmitting mechanisms are coaxial about the second axis of rotation and are rotating or stationary friction clutches.

13. The multi-speed transmission of claim 9, wherein the seven torque-transmitting mechanisms are engagable in combinations of two such that at least one of the four torque-transmitting mechanisms coaxial about the third axis of rotation is engaged in each of the forward speed ratios.

14. A multi-speed transmission comprising:
an input member;
an output member;
a stationary member;
an intermediate member;
a simple planetary gear set having a sun gear member, a ring gear member, a carrier member, and a set of pinion gears supported for rotation by the carrier member and meshing with both the sun gear member and the ring gear member; wherein the input member, the output member, the intermediate member, and the simple planetary gear set are arranged coaxially with one another to define a first axis of rotation;
a first and a second layshaft defining a second axis of rotation and a third axis of rotation, respectively;
seven selectively engagable torque-transmitting mechanisms including two brakes and five rotating-type clutches;
five sets of intermeshing gears, some of which are arranged to transfer torque from the input member to the layshafts, and others of which are arranged to transfer torque from a respective one of the layshafts to one of the intermediate member and the simple planetary gear set; each set of intermeshing gears being axially spaced from the other sets of intermeshing gears;
wherein the sun gear member is connected for common rotation with the intermediate member, the carrier member is connected for common rotation with the output member, and the ring gear member is connected for common rotation with one of the members of the intermeshing gear sets;
wherein each of the seven torque-transmitting mechanisms is selectively engagable to connect a different respective gear of the sets of intermeshing gears to a respective one of the layshafts or to the stationary member; and the seven torque-transmitting mechanisms being engagable in different combinations of two to establish up to ten forward speed ratios and a reverse speed ratio between the input member and the output member.

15. The multi-speed transmission of claim 14, wherein the seven torque-transmitting mechanisms are selectively engagable to establish eight forward speed ratios with only one of the shifts between subsequent ones of the forward speed ratios being a double-transition shift and the remaining shifts between subsequent ones of the forward speed ratios being single-transition shifts; and wherein the seven torque-transmitting mechanisms are selectively engagable to establish ten forward speed ratios with only two of the shifts between subsequent ones of the forward speed ratios being double-transition shifts and the remaining shifts between subsequent ones of the forward speed ratios being single-transition shifts.

16. The multi-speed transmission of claim 14, wherein the seven torque-transmitting mechanisms are selectively engagable to establish eight forward speed ratios with step ratios between at least some subsequent ones of the forward speed ratios being identical.

17. A multi-speed transmission comprising:
an input member;
an output member;
a stationary member;
an intermediate member;
a simple planetary gear set;
wherein the input member, the output member, the intermediate member, and the simple planetary gear set are arranged coaxially with one another to define a first axis of rotation;
a first and a second layshaft defining a second axis of rotation and a third axis of rotation, respectively;
seven selectively engagable torque-transmitting mechanisms;
five sets of intermeshing gears, some of which are arranged to transfer torque from the input member to the layshafts, and others of which are arranged to transfer torque from the layshafts to one of the intermediate member and the simple planetary gear set; each set of intermeshing gears being axially spaced from the other sets of intermeshing gears;
wherein the seven torque-transmitting mechanisms are each selectively engagable to connect a different respective gear of the sets of intermeshing gears to a respective one of the layshafts or to the stationary member; wherein the seven torque-transmitting mechanisms are engagable in different combinations to establish multiple forward speed ratios and a reverse speed ratio between the input member and the output member; and wherein the seven torque-transmitting mechanisms includes two brakes and five rotating-type clutches.

18. The multi-speed transmission of claim 17, wherein the seven torque-transmitting mechanisms are engagable in different combinations of two to establish ten forward speed ratios and the reverse speed ratio between the input member and the output member with only two of the shifts between subsequent forward speed ratios being double-transition shifts and the rest of the shifts between subsequent forward speed ratios being single transition shifts.

19. The multi-speed transmission of claim 17, wherein a first and a second of the seven torque-transmitting mechanisms are selectively engagable to ground the first and the second layshafts to the stationary member, respectively.

* * * * *